W. Sharr,
Cider Mill.

Nº 59,864.  Patented Nov. 20, 1866.

Witnesses:  Inventor:

United States Patent Office.

IMPROVEMENT IN CIDER MILLS.

WILLIAM SHAW, OF NEW GORDON, OHIO.

Letters Patent No. 59,864, dated November 20, 1866.

SPECIFICATION.

TO ALL WHOM IT MAY CONCERN:

Be it known that I, WILLIAM SHAW, of New Gordon, in the county of Columbiana, and State of Ohio, have invented a new and improved Cider Mill; and I do hereby declare that the following is a full, clear, and exact description thereof, which will enable others skilled in the art to make and use the same, reference being had to the accompanying drawings, forming part of this specification, in which—

Figure 1:
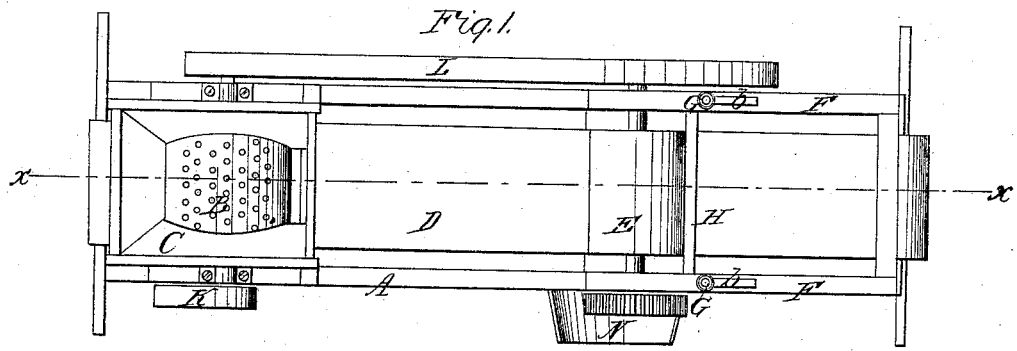

Figure 1 is a plan or top view of my invention.

Figure 2:
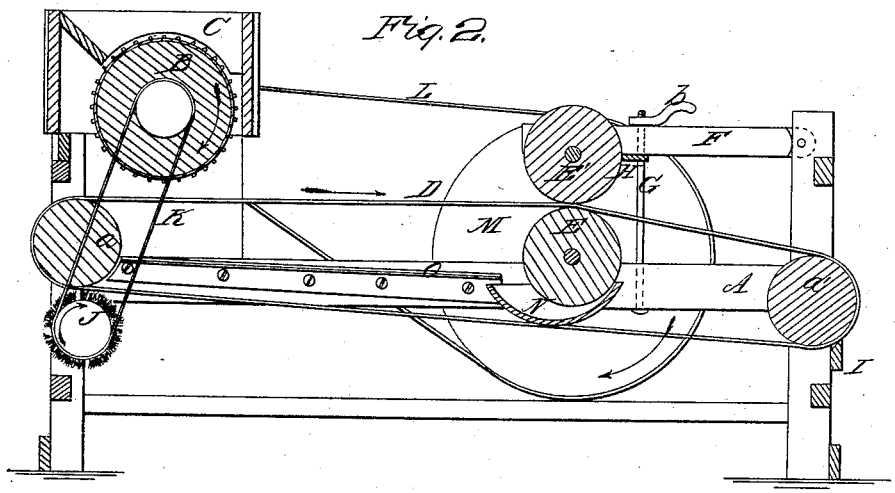

Figure 2, a side sectional view of the same taken in the line $x\ x$, fig. 1.

Similar letters of reference indicate like parts.

This invention relates to a new and improved cider mill, of that class which grind the apples and express the juice therefrom at one and the same operation. The invention consists in the employment or use of an endless apron, pressure-rollers, grinding-cylinder, scrapers, and a rotary brush—all arranged as hereafter fully shown and described—whereby apples may be crushed and the juice expressed from them at one operation, with but a moderate expenditure of power, and by a very simple arrangement of parts.

A represents a rectangular framing, which may be constructed in any proper manner to support the working parts, and B is a cylinder placed transversely on the upper part of said framing, near one end, and having a hopper, C, placed over it, in which hopper the apples to be operated upon are placed. The cylinder, B, has a toothed or corrugated periphery, formed or arranged in any proper manner. D is an endless apron which works over rollers $a\ a'$; at the ends of the framing A and E E' are two pressure-rollers placed one over the other in the same axial plane. The lower roller, E, works in fixed bearings in the framing A, and is between the upper and lower parts of the endless apron, while the upper roller, E', has its bearings in bars F F, which are provided in one end of the framing A, and adjusted by screw rods G and nuts $b$. The upper part of the endless apron D works or passes between the rollers E E', and the pressure of the upper roller E' may be graduated as desired by turning the nuts $b$. To the under sides of the inner parts of the bars F F, a metal bar, H, is attached which is in contact with the periphery of the upper roller E', and serves as a scraper, and a similar scraper, I, is attached to one end of the framing A to bear against the endless apron D as it passses around the roller $a'$. J is a rotary brush placed transversely in one end of the framing A, below the roller $a$, said brush working in contact with the endless apron, and being driven by a belt K from the shaft of the grinding-cylinder B, the latter being driven by a belt L, from a pulley M, on the shaft of the lower roller E. N is a spout placed under the lower roller E, and O is a chute placed between the upper and lower parts of the endless apron and between the rollers $a$ and E.

The apples to be operated upon are placed in the hopper C, and are crushed or ground by the rotation of the cylinder B, the ground apples dropping upon the upper part of the endless apron D, which conveys them to the rollers E E', the latter expressing the juice from them, the juice passing down through the apron into spout N, which discharges it into any vessel prepared to receive it, while the pomace is scraped off the apron by the scraper I. The rotary brush J takes off any pomace which may chance to adhere to the apron while passing around roller $a$, and the scraper H takes off any seeds or pomace which may adhere to the roller E'.

Having thus described my invention, I claim as new, and desire to secure by Letters Patent—

The cider mill, consisting of the toothed cylinder B, endless apron D, rollers E E', adjustable pivoted bars F, scrapers H I, brush J, spout N, and chute O, arranged and operating substantially as described for the purpose specified.

WILLIAM SHAW.

Witnesses:
CLAYTON LAMBORN,
SAMUEL H. BENNETT.